United States Patent
Chhabra

(10) Patent No.: US 9,667,493 B2
(45) Date of Patent: *May 30, 2017

(54) MECHANISM FOR FACILITATING DYNAMIC AND TRUSTED CLOUD-BASED EXTENSION UPGRADES FOR COMPUTING SYSTEMS

(71) Applicant: INTEL CORPORATION, Santa Clara, CA (US)

(72) Inventor: Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,037

(22) Filed: Feb. 3, 2015

(65) Prior Publication Data

US 2015/0195127 A1   Jul. 9, 2015

Related U.S. Application Data

(63) Continuation of application No. 13/539,201, filed on Jun. 29, 2012, now Pat. No. 8,949,818.

(51) Int. Cl.
*G06F 9/44* (2006.01)
*H04L 12/24* (2006.01)
(Continued)

(52) U.S. Cl.
CPC .............. *H04L 41/082* (2013.01); *G06F 8/65* (2013.01); *G06F 21/57* (2013.01); *H04L 67/141* (2013.01);
(Continued)

(58) Field of Classification Search
CPC ..... G06F 8/61; G06F 8/65; G06F 8/67; G06F 8/68

See application file for complete search history.

(56) References Cited

U.S. PATENT DOCUMENTS 6,978,452 B2   12/2005  Oesterreicher et al.
7,206,852 B2    4/2007  Ferguson et al.
(Continued)

FOREIGN PATENT DOCUMENTS

CN    101180608    5/2008
KR    10-0585753   6/2006
(Continued)

OTHER PUBLICATIONS

Hwang et al., "Trusted Cloud Computing with Secure Resources and Data Coloring", 2010 IEEE, vol. 14, Issue 5, Sep. 2010, pp. 14-22; <http://ieeexplore.ieee.org/stamp/stamp.jsp?tp=&arnumber=5562490>.*

(Continued)

*Primary Examiner* — Thuy Dao
*Assistant Examiner* — Ben C Wang
(74) *Attorney, Agent, or Firm* — Blakely, Sokoloff, Taylor & Zafman LLP

(57) ABSTRACT

A mechanism is described for facilitating dynamic and trusted cloud-based extension upgrades for computing systems according to one embodiment of the invention. A method of embodiments of the invention includes detecting a computing device needing an upgrade. The upgrade may relate to a hardware component at the computing device needing an upgrade element for the upgrade. The method may further include calling a first cloud server to provide the upgrade over a network. The first cloud server may have first resources including the upgrade element. The method may further include facilitating the hardware component to access the upgrade element at the first cloud server without having to upgrade or replace the hardware component.

9 Claims, 5 Drawing Sheets

(51) Int. Cl.
*H04L 29/08* (2006.01)
*G06F 21/57* (2013.01)
*G06F 9/445* (2006.01)

(52) U.S. Cl.
CPC ............... *G06F 8/61* (2013.01); *G06F 8/64* (2013.01); *G06F 8/67* (2013.01); *G06F 8/68* (2013.01)

(56) References Cited

U.S. PATENT DOCUMENTS

| | | | |
|---|---|---|---|
| 7,379,419 B2 | 5/2008 | Collins | |
| 7,461,373 B2 | 12/2008 | Herle et al. | |
| 7,613,920 B2 | 11/2009 | Gustave et al. | |
| 7,752,618 B2 | 7/2010 | Moles | |
| RE42,685 E | 9/2011 | Oesterreicher et al. | |
| 8,191,058 B2 | 5/2012 | Chai et al. | |
| 8,291,406 B2 | 10/2012 | Milne et al. | |
| 8,375,380 B2 | 2/2013 | Shahidzadeh et al. | |
| 8,949,818 B2* | 2/2015 | Chhabra ............... G06F 8/65 717/168 | |
| 8,959,363 B2* | 2/2015 | Saripalli ............... H04L 41/044 713/189 | |
| 2004/0133887 A1 | 7/2004 | Herle et al. | |
| 2005/0033978 A1 | 2/2005 | Hyser | |
| 2005/0066019 A1 | 3/2005 | Egan et al. | |
| 2005/0108534 A1 | 5/2005 | Bajikar et al. | |
| 2005/0160045 A1 | 7/2005 | Watanabe et al. | |
| 2006/0050885 A1 | 3/2006 | Camus et al. | |
| 2006/0106806 A1 | 5/2006 | Sperling | |
| 2007/0006213 A1 | 1/2007 | Shahidzadeh et al. | |
| 2007/0094719 A1* | 4/2007 | Scarlata ............... 726/9 | |
| 2007/0300069 A1* | 12/2007 | Rozas ............... 713/176 | |
| 2009/0094684 A1 | 4/2009 | Chinnusamy et al. | |
| 2009/0183149 A1 | 7/2009 | Milne et al. | |
| 2009/0293051 A1* | 11/2009 | Krywaniuk ............... G06F 8/63 717/173 | |
| 2010/0037215 A1 | 2/2010 | Meiss et al. | |
| 2010/0042869 A1* | 2/2010 | Szabo ............... G06F 8/67 714/4.1 | |
| 2010/0058323 A1* | 3/2010 | Shahidzadeh et al. ....... 717/173 | |
| 2010/0095120 A1* | 4/2010 | Thom ............... H04L 9/3234 713/170 | |
| 2011/0151836 A1 | 6/2011 | Dadu et al. | |
| 2011/0161672 A1* | 6/2011 | Martinez et al. ............. 713/176 | |
| 2011/0179132 A1 | 7/2011 | Mayo et al. | |
| 2011/0302425 A1* | 12/2011 | Saripalli ............... H04L 41/044 713/189 | |
| 2012/0023334 A1 | 1/2012 | Brickell et al. | |
| 2012/0054731 A1 | 3/2012 | Aravamudan et al. | |
| 2013/0006866 A1 | 1/2013 | Pendakur et al. | |
| 2013/0124458 A1 | 5/2013 | Barreto et al. | |
| 2013/0198346 A1* | 8/2013 | Jubran et al. ............... 709/220 | |
| 2013/0202055 A1 | 8/2013 | Caliguri et al. | |
| 2013/0235798 A1 | 9/2013 | Choi et al. | |
| 2013/0254842 A1 | 9/2013 | Jang et al. | |
| 2014/0007072 A1* | 1/2014 | Chhabra ............... G06F 8/65 717/171 | |
| 2014/0046746 A1 | 2/2014 | Davis et al. | |
| 2014/0101423 A1* | 4/2014 | Kubo ............... G06F 11/006 713/1 | |
| 2014/0130035 A1 | 5/2014 | Desai et al. | |
| 2014/0130151 A1* | 5/2014 | Krishnamurthy ..... G06F 21/572 726/22 | |
| 2014/0181893 A1* | 6/2014 | Von Bokern et al. ............ 726/1 | |
| 2015/0188944 A1* | 7/2015 | Dyer et al. .................... 717/173 | |
| 2015/0234646 A1* | 8/2015 | Schafer ............... G06F 8/61 717/174 | |
| 2015/0256332 A1* | 9/2015 | Raj ............... H04L 9/085 713/150 | |
| 2015/0281189 A1* | 10/2015 | Nayshtut ............... H04L 63/045 713/168 | |
| 2015/0286473 A1* | 10/2015 | Weiss ............... G06F 8/61 717/174 | |
| 2015/0347280 A1* | 12/2015 | Bennah ............... G06F 11/3688 714/38.1 | |
| 2016/0103675 A1* | 4/2016 | Aabye ............... G06F 8/65 717/170 | |
| 2016/0203313 A1* | 7/2016 | El-Moussa ............... G06F 8/65 726/23 | |

FOREIGN PATENT DOCUMENTS

| | | |
|---|---|---|
| KR | 10-0883208 | 2/2009 |
| WO | WO-2006/127949 | 11/2006 |

OTHER PUBLICATIONS

VMware, "VMware Virtualization and Cloud Management Solutions", 2011 VMware, pp. 1-14; <http://www.vmware.com ... VMware-Virtualization-and-Cloud-Management-Solutions-White-Paper.pdf>.*

Yu et al., "Cloud Computing and Security Challenges", ACM, ACM-SE'12, Mar. 29-31, 2012, pp. 1-5; <http://dl.acm.org/citation.cfm?id=2184512.2184581 ... 426126065&CFTOKEN=89011491>.*

PCT/US2013/044582, PCT Search Report and Written Opinion, Mailed Aug. 29, 2013, 9 pages.

EP Application No. 13809147 European Communication and Search Report mailed Jan. 26, 2016, 7 pages.

Hwang, et al., "trusted Cloud Computing with Secure Resources and Data Coloring", 2010 IEEE, vol. 14, Issue 5, Sep. 2010, pp. 14-22; ,http://ieeexplore.ieee.org/stamp/stamp.jsp?tp=&arnumber=5562490.

VMware, "VMware Virtualization and Cloud Management Solutions", 2011 VMWare, pp. 1-14; <http://vmware.com///VMware-virutalization-and-cloud-management-solutions-white-paper.pdf>.

Yu, et al., "Cloud Computing and Security Challenges", ACM ACM-SE'12, Mar. 29-31, 2012, pp. 1-5; <http://dl.acm.org/citation.cfm?id=2184512.2184581 ...426126065&CFTOKEN=89011491.

CN Application No. 201380028490.X First Office Action, May 5, 2016, 4 pages.

* cited by examiner

MECHANISM FOR FACILITATING DYNAMIC AND TRUSTED CLOUD-BASED EXTENSION UPGRADES FOR COMPUTING SYSTEMS

CLAIM OF PRIORITY

This application is a continuation application of U.S. patent application Ser. No. 13/539,201, entitled "Mechanism for Facilitating Dynamic and Trusted Cloud-Based Extension Upgrades for Computing Systems", by Jasmeet Chhabra, filed Jun. 29, 2012, now allowed, the benefit of and priority to which are claimed thereof, and the entire contents of which are incorporated herein by reference.

FIELD

Embodiments of the invention relate to computer upgrading environments. More particularly, embodiments of the invention relate to a mechanism for facilitating dynamic and trusted cloud-based extension upgrades for computing systems.

BACKGROUND

Software applications and various hardware computing resources often require updating and/or upgrading to continue to perform better; however, current updating/upgrading environments are limited in terms of updates/upgrades, particularly as they relate to hardware resources and features, which can limit capabilities provided to software applications and other computing resources. For example, when a new or upgraded hardware feature is needed, it may not be available at the system to be added and may require the user to wait until a new hardware platform is available in the market. In other words, often new services cannot be enabled on older platforms and one has to wait for a new platform or the capability to become available (which could take several months or even years).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in details in order not to obscure the understanding of this description.

In one embodiment, a mechanism is provided for facilitating dynamic and trusted cloud-based extension upgrades at computing systems without having to require hardware upgrades. For example, a computing system having an older platform may not be capable of employing an enhancement (such as a new application programming interface (API), etc.) without a hardware upgrade. In this case, in one embodiment, the mechanism may contact one or more cloud extension servers to obtain the enhancement, such as the API, without having to perform the hardware upgrade on the computing system. Throughout this document, various security environments (such as trusted execution environment (TEE) are used as examples, but it is contemplated that embodiments of the invention are not limited to simply the security environments and that they may be applied to any number and type of system software and hardware upgrades, such as APIs, Graphical User Interface (GUI) windows, camera features, audio features, etc.

Figure 1:
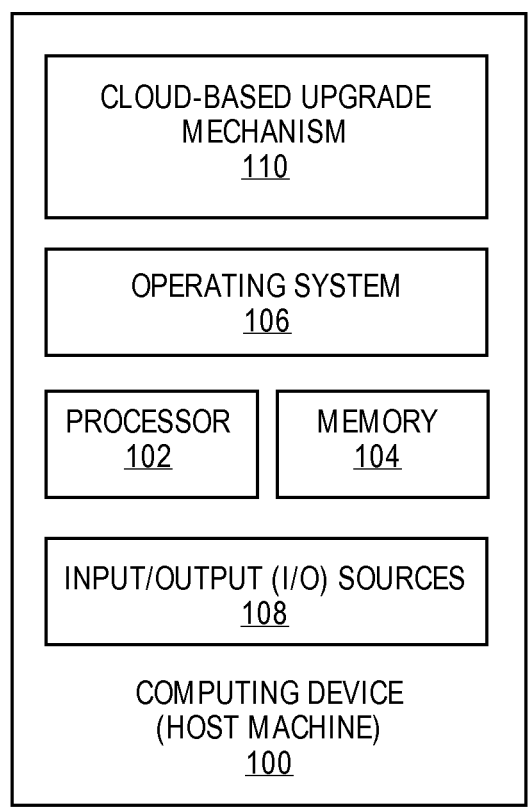
FIG. 1 illustrates a dynamic cloud-based upgrade mechanism employed at a computing device according to one embodiment of the invention.

FIG. 1 illustrates a dynamic cloud-based upgrade mechanism 110 employed at a computing device 100 according to one embodiment of the invention. Computing device 100 (such as computing system 400 of FIG. 4) serves as a host machine employing dynamic cloud-based upgrade mechanism (also referred to as "cloud-based upgrade mechanism", "upgrade mechanism" or simply "mechanism") 110 to facilitate dynamic cloud-based upgrading of resources at computing devices (e.g., smartphones, etc.). Computing device 100 may include mobile computing devices, such as cellular phones including smartphones (e.g., iPhone® by Apple®, BlackBerry® by Research in Motion (RIM®), etc.), other phones (e.g., landlines), handheld computing devices, personal digital assistants (PDAs), etc., tablet computers (e.g., iPad® by Apple®, Samsung® Galaxy Tab®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (O/S) 106 serving as an interface between any hardware or physical resources of the computer device 100 and a user. Computing device 100 further includes one or more processors 102, memory devices 104, network devices (now shown), drivers (not shown), or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", and the like, may be used interchangeably and synonymously throughout this document.

Figure 2:
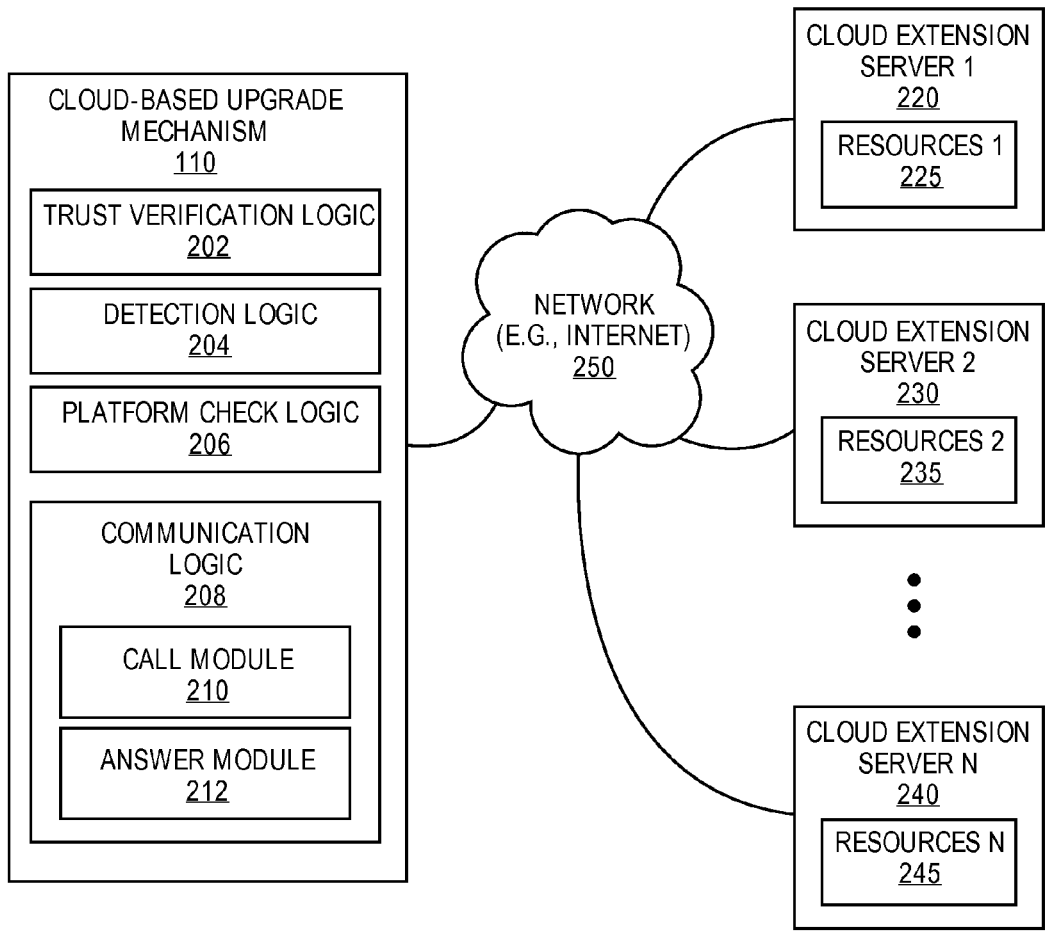
FIG. 2 illustrates a dynamic cloud-based upgrade mechanism according to one embodiment.

FIG. 2 illustrates a dynamic cloud-based upgrade mechanism 110 according to one embodiment. In one embodiment, cloud-based upgrade mechanism 110 includes a number of components (also referred to as "logic" or "modules"), such as trust verification logic 202, detection logic 204, platform check logic 206, and communication logic 208 including a call module 210 and an answer module 212. In one embodiment, cloud-based upgrade mechanism 110 may be employed at a computing device, such as computing device 100 of FIG. 1, to provide cloud-based upgrading of any number and type of resources (e.g., hardware resources) at the host computing device.

In one embodiment, various resources 1-N 225, 235, 245 are placed at a number of cloud extension servers 1-N 220, 230, 240 (also referred to as "cloud extensions", "cloud systems", "cloud servers", or simply "cloud") to be accessed and provided as upgrades to the host machine using cloud-based upgrade mechanism 110 over a network 250 (e.g., Internet). In one embodiment, trust verification logic 202 is used to establish trust between cloud-based upgrade mechanism 110 and one or more cloud extension servers 220, 230, 240 to verify and authenticate each cloud extension server 220, 230, 240 and its resources 225, 235, 245 before any communication or exchange may take place. The establishing of trust or verification or authentication may be done using any one or more of existing authentication techniques or trust establishment protocols, such as key exchange protocols, enhanced privacy identification (EPID)-based sigma key exchange, etc. This trust establishment process may be a one-time process, such as trust establishment may be performed between cloud-based upgrade mechanism 110 and cloud extension server 1 220 and thereafter with cloud extension server 2 230 and so on as new cloud extension servers N 240 are continuously added to the cloud network 250 and placed in communication with mechanism 110.

With the establishment of trust, any future communication between mechanism 110 and cloud servers 220, 230, 240 is authorized to occur over network 250. Now, let us suppose, if an upgrade (e.g., hardware upgrade) to a component is needed at the host machine, the mechanism 110 may automatically detect the need for an upgrade using detection logic 204. Mechanism 110 may automatically detect the upgrade need or be reached by a software application or the operating system or some other logic at the host machine. For example, detection logic 204 detects the TEE hardware at the host machine calling on an Elliptic Curve Cryptography (ECC) API that does not exist in the current TEE hardware. In response, in one embodiment, platform check logic 206 checks and verifies whether the upgrade capability already exists at the local platform of the host computing device. For example, platform check logic 204 checks the platform to see whether the platform contains the ability to upgrade the TEE hardware to have an ECC API. If the capability already exists at the local platform, the upgrade is locally performed and there is no need to contact any of the cloud servers 220, 230, 240.

If the local platform is determined to be incapable of performing local upgrades (such as the upgrade is not available and requires a new piece of hardware or a new platform, etc.), call module 210 of communication logic 208 is used to call one or more cloud servers 220, 230, 240 to determine whether any of resources 1-N 225, 235, 245 includes the needed upgrade. Continuing with the TEE hardware example, if the platform is not capable of upgrading the TEE hardware with or providing it access to the ECC API, call module 210 calls on cloud servers 1-N 220, 230, 240 to determine whether one of cloud servers 1-N 220, 230, 240 can provide the needed ECC API.

In one embodiment, upon calling on cloud servers 1-N 220, 230, 240, it is determined that resources 1 225 at cloud server 1 220 contains the needed upgrade element and may provide it to the host machine. With that determination, cloud server 1 220 answers back with providing access to the upgrade element. In other words, in one embodiment, the hardware needing the upgrade is provided access to the upgrade element contained within resources 1 225 at cloud server 1 220 without having to upgrade the existing hardware to a newer version or requiring a new platform or piece of hardware, etc. Continuing with the TEE hardware example, upon determining the ECC API is contained within resources 1 225 and thus can be provided by cloud server 1 220, TEE hardware is provided access to the ECC API at cloud server 1 220 without having to upgrade or replace the TEE hardware at the host machine. In one embodiment, this access can be short-termed or long-termed depending on various needs and resources of the host machine or as desired by the user (e.g., system administrator, software programmer, end-user/consumer, etc.).

It is contemplated that any number and type of components may be added to and/or removed from the cloud-based upgrade mechanism 110 to facilitate various embodiments of the invention including adding, removing, and/or enhancing certain features. For brevity, clarity, and ease of understanding of the cloud-based upgrade mechanism 110, many of the standard and/or known components, such as those of a computing device, are not shown or discussed here. It is contemplated that embodiments of the invention are not limited to any particular technology, topology, system, architecture, and/or standard and are dynamic enough to adopt and adapt to any future changes.

Figure 3A:
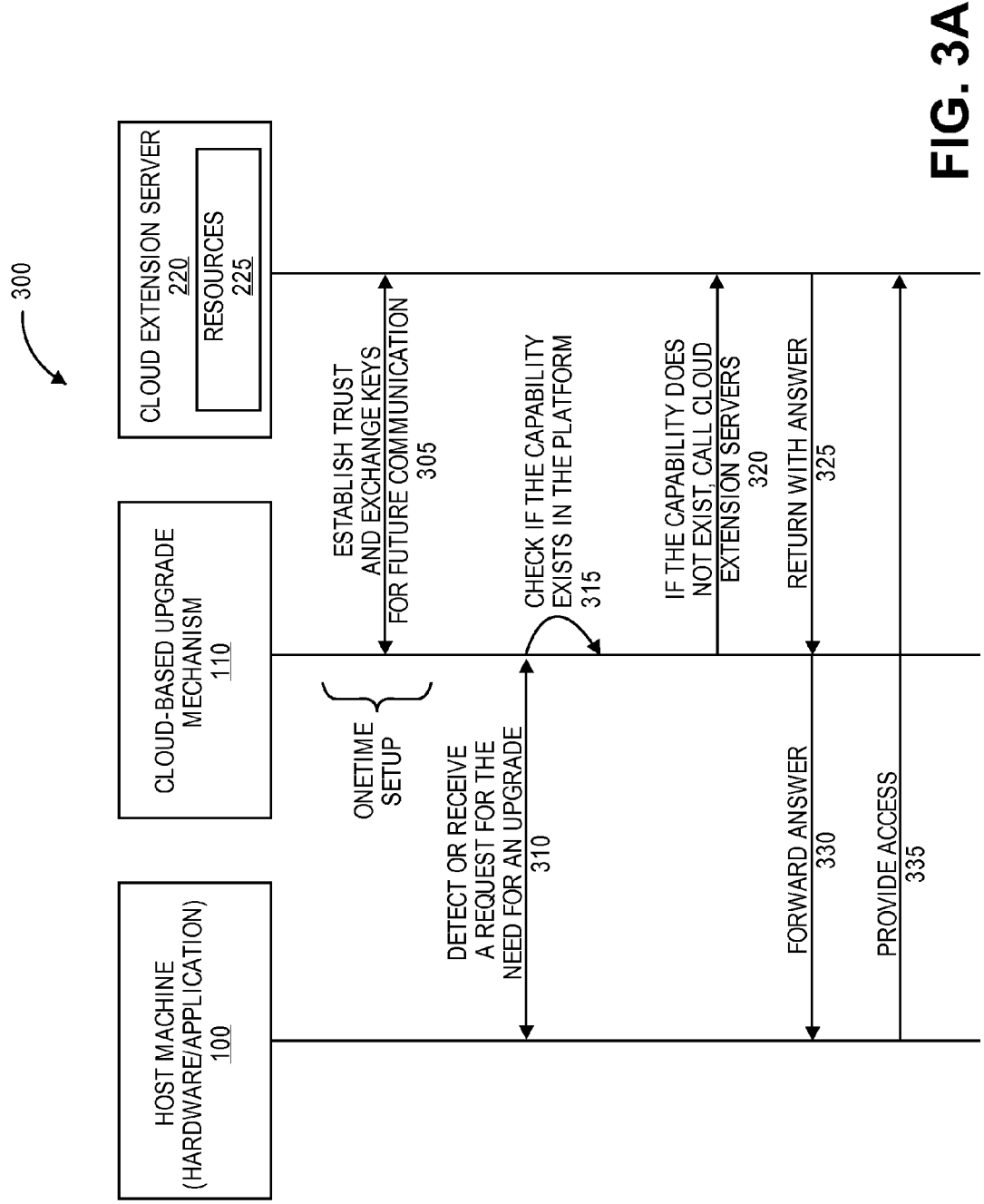
FIG. 3A illustrates a transaction sequence for facilitating dynamic and trusted cloud-based extension upgrades for computing systems according to one embodiment of the invention.

FIG. 3A illustrates a transaction sequence 300 for facilitating dynamic and trusted cloud-based extension upgrades for computing systems according to one embodiment of the invention. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by cloud-based upgrade mechanism 110 of FIG. 1.

Transaction sequence 300 begins at 305 with establishment of trust between cloud-based upgrade mechanism 110 and cloud extension server 220 having resource 225. In one embodiment, the cloud-based upgrade mechanism 110 may be employed at a host machine 100 where hardware or an application may need an upgrade. At 310, cloud-based upgrade mechanism 110 automatically detects or receives a notification for the need for an upgrade. At 315, cloud-based mechanism 110 checks to determine whether the capability to upgrade already exists at a local platform within the host machine 100. If the capability exists, the upgrade is performed locally.

At 320, if the capability does not exist, cloud-based upgrade mechanism 110 places a call with the cloud extension server 220 to determine whether its resources 225 can offer the needed upgrade. At 325, the cloud extension server 220 returns with an answer as to whether its resources 225 can provide the needed upgrade. At 330, the answer is forwarded on to the host machine 100. If not, the cloud-based upgrade mechanism 110 may call another cloud based extension server for the upgrade. If yes, at 335, the hardware or application at the host machine 100 needing the upgrade is provided access to the upgrade through the resources 225 at the cloud extension server 220.

Figure 3B:
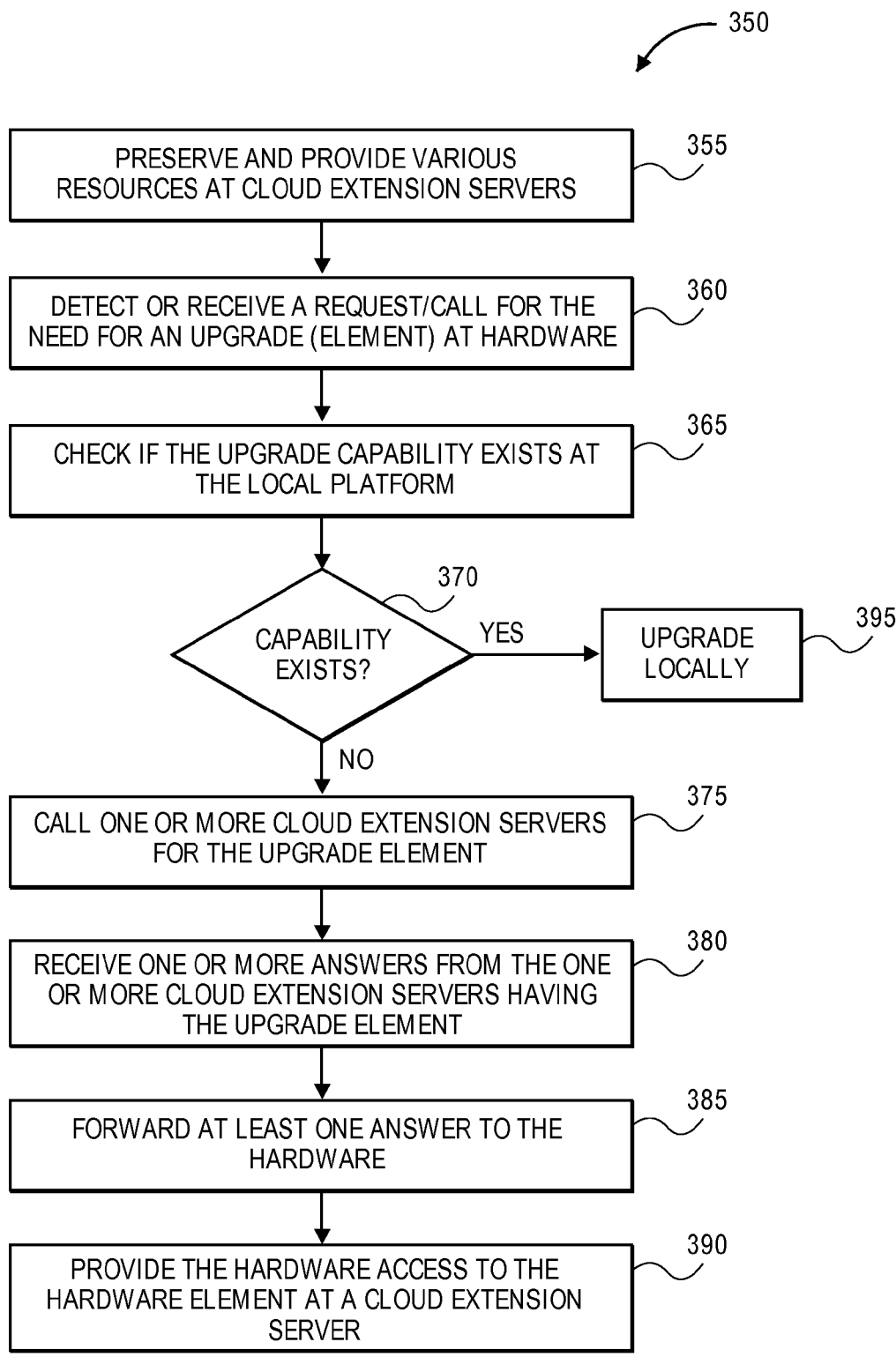
FIG. 3B illustrates a method for facilitating dynamic and trusted cloud-based extension upgrades for computing systems according to one embodiment of the invention.

FIG. 3B illustrates a method 350 for facilitating dynamic and trusted cloud-based extension upgrades for computing systems according to one embodiment of the invention. Method 350 may be performed by processing logic that may comprise hardware (e.g., circuitry, dedicated logic, programmable logic, etc.), software (such as instructions run on a processing device), or a combination thereof. In one embodiment, method 350 may be performed by cloud-based upgrade mechanism 110 of FIG. 1.

Method 350 begins at block 355 with preserving and providing of various resources at a number of cloud extension servers. In one embodiment, resources may include hardware elements or components and software modules, etc., that may be provided, over a network, to a computing device to upgrade its hardware or software components. In other words, instead of having to upgrade or replace a piece of hardware at a computing device, the computing system may be provided access to an upgrade element at a cloud extension server that can serve the same purpose without having to upgrade/replace the hardware. At block 360, a need for an upgrade at the computing device is detected or a notification regarding the upgrade is received. At block 365, the capability of a local platform at the computing device is checked. At block 370, a determination is made as to whether an update capability exists at the local platform of the computing device. If yes, a local upgrade of the hardware is performed at block 395.

At block 375, if the local capability does not exist, one or more cloud extension servers are called over a network. At block 380, one or more answers from the one or more cloud extension servers are received. The one or more answers disclose whether at least one of the one or more cloud extension servers include the needed upgrade element. At block 385, at least one answer received from a cloud extension server having the upgrade element is forwarded to the computing device. At block 390, the hardware needing the upgrade is provided access to the upgrade element at the cloud extension server to avoid having to upgrade or replace the hardware.

Figure 4:
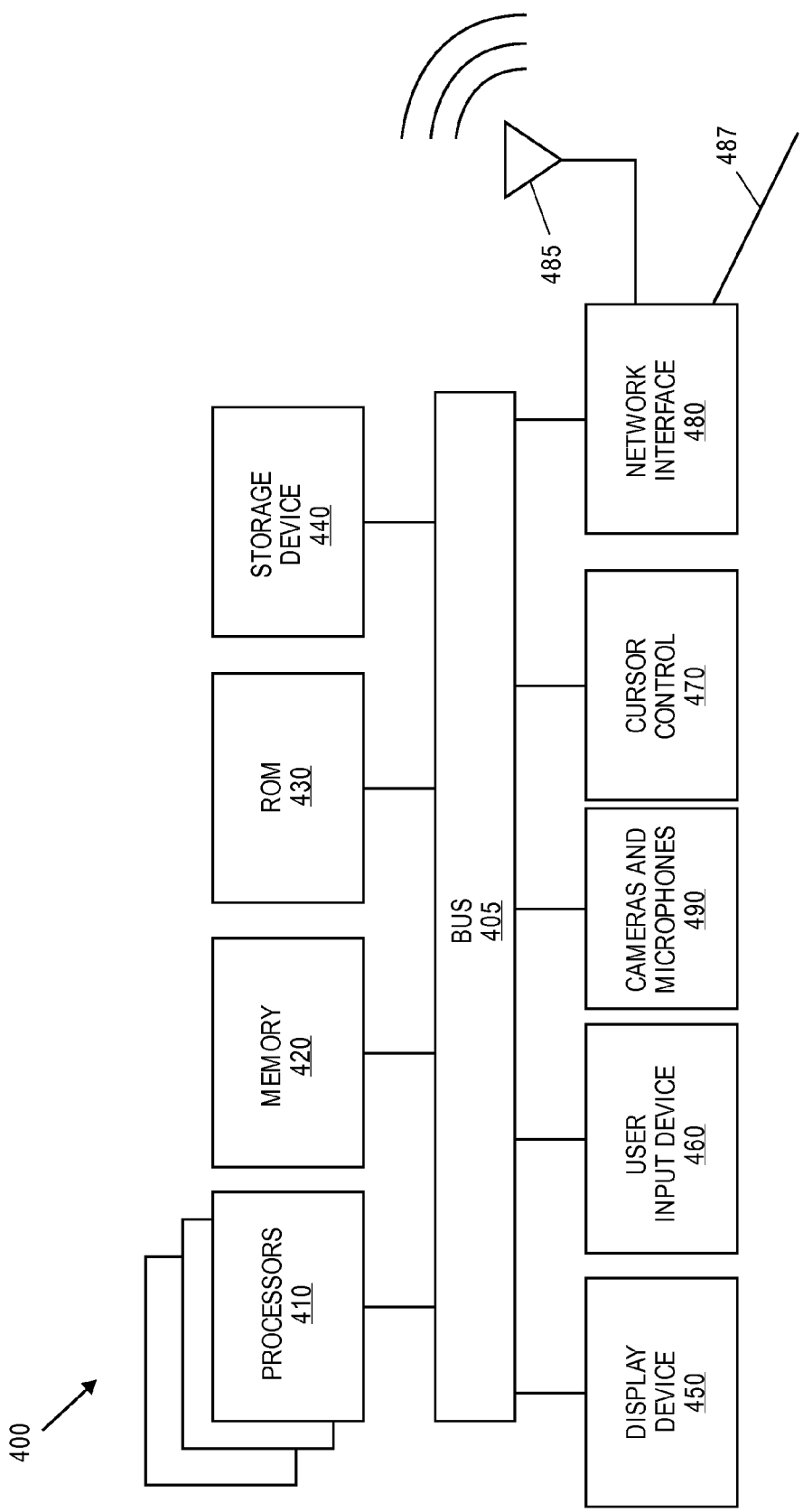
FIG. 4 is block diagram of a computer system suitable for implementing embodiments of the present disclosure according to one embodiment of the invention.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components.

Computing system 400 includes bus 405 (or a link, an interconnect, or another type of communication device or interface to communicate information) and processor 410 coupled to bus 405 that may process information. While computing system 400 is illustrated with a single processor, electronic system 400 may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, or cursor direction keys to communicate direction information and command selections to processor 410 and to control cursor movement on display 450.

Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), wide area network (WAN), metropolitan area network (MAN), personal area network (PAN), Bluetooth, an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may including one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments. Specifics in the examples may be used anywhere in one or more embodiments. The various features of the different embodiments may be variously combined with some features included and others excluded to suit a variety of different applications. Some embodiments pertain to a method comprising detecting a computing device needing an upgrade, wherein the upgrade relates to a hardware component at the computing device needing an upgrade element for the upgrade; calling a first cloud server to provide the upgrade over a network, wherein the first cloud server having first resources including the upgrade element; and facilitating the hardware component to access the upgrade element at the first cloud server without having to upgrade or replace the hardware component.

Embodiments include any of the above methods further comprising placing and maintaining the first resources at the first cloud server.

Embodiments include any of the above methods further comprising calling a second cloud server having second resources to provide the upgrade, if the first resources at the first cloud server do not include the upgrade element.

Embodiments include any of the above methods further comprising facilitating the hardware component to access the upgrade element at the second cloud server without having to upgrade or replace the hardware component.

Embodiments include any of the above methods further comprising prior to calling the first cloud server, checking whether a platform at the computing device is capable of performing the upgrade.

Embodiments include any of the above methods further comprising facilitating the upgrade of the hardware component locally at the computing device if the platform is determined to be capable of performing the upgrade.

Embodiments include any of the above methods further comprising receiving an answer from the first cloud server, wherein the answer includes information regarding whether the first resources include the upgrade element.

In another embodiment, an apparatus comprises: a cloud-based upgrade mechanism having first logic to detect a computing device needing an upgrade, wherein the upgrade relates to a hardware component at the computing device needing an upgrade element for the upgrade; second logic to call a first cloud server to provide the upgrade over a network, wherein the first cloud server having first resources including the upgrade element; and third logic to facilitate the hardware component to access the upgrade element at the first cloud server without having to upgrade or replace the hardware component.

Embodiments include the apparatus above further comprising fourth logic to place and maintain the first resources at the first cloud server.

Embodiments include the apparatus above wherein the second logic is further to call a second cloud server having second resources to provide the upgrade, if the first resources at the first cloud server do not include the upgrade element.

Embodiments include the apparatus above wherein the third logic is further to facilitate the hardware component to access the upgrade element at the second cloud server without having to upgrade or replace the hardware component.

Embodiments include the apparatus above further comprising fifth logic to, prior to calling the first cloud server, check whether a platform at the computing device is capable of performing the upgrade.

Embodiments include the apparatus above further comprising sixth logic to facilitate the upgrade of the hardware component locally at the computing device if the platform is determined to be capable of performing the upgrade.

Embodiments include the apparatus above further comprising seventh logic to receive an answer from the first cloud server, wherein the answer includes information regarding whether the first resources include the upgrade element.

In another embodiment, a system comprises: a computing device having a memory to store instructions, and a processing device to execute the instructions, wherein the instructions cause the processing device to detect a computing device needing an upgrade, wherein the upgrade relates to a hardware component at the computing device needing an upgrade element for the upgrade; call a first cloud server to provide the upgrade over a network, wherein the first cloud server having first resources including the upgrade element; and facilitate the hardware component to access the upgrade element at the first cloud server without having to upgrade or replace the hardware component.

Embodiments include the system above wherein the processing device is further to place and maintain the first resources at the first cloud server.

Embodiments include the system above wherein the processing device is further to call a second cloud server having second resources to provide the upgrade, if the first resources at the first cloud server do not include the upgrade element.

Embodiments include the system above wherein the processing device is further to facilitate the hardware component to access the upgrade element at the second cloud server without having to upgrade or replace the hardware component.

Embodiments include the system above wherein the processing device is further to, prior to calling the first cloud server, check whether a platform at the computing device is capable of performing the upgrade.

Embodiments include the system above wherein the processing device is further to facilitate the upgrade of the hardware component locally at the computing device if the platform is determined to be capable of performing the upgrade.

Embodiments include the system above wherein the processing device is further to receive an answer from the first cloud server, wherein the answer includes information regarding whether the first resources include the upgrade element.

In another embodiment, an apparatus comprises means for performing any one or more of the operations mentioned above.

In yet another embodiment, at least one machine-readable comprising a plurality of instructions that in response to being executed on a computing device, causes the computing device to carry out a method according to any one or more of the operations mentioned above.

In yet another embodiment, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
   detecting a hardware component of a computing device seeking an upgraded hardware element to replace an existing hardware element of the hardware component;
   calling, over a network, a plurality of cloud servers to determine whether one or more of the plurality of cloud servers are capable of offering the upgraded hardware element, wherein calling includes finding a cloud server capable of offering the updated hardware component;
   if the upgraded hardware element is not available locally, authenticating the cloud server and establishing trust between the cloud server and the computing device to facilitate communication between the cloud server and the computing device, and facilitating the hardware component to access and use the upgraded hardware element at the cloud server without having to upgrade or replace the existing hardware element of the hardware component, wherein the upgraded hardware element is accessed or used on a short-term basis or a long-term basis based on an amount of time for which the upgraded hardware element is needed by the hardware component of the computing device;
   if the upgraded hardware element is available locally, performing local upgrading of the existing hardware element of the hardware component; and
   in response to calling, receiving a reply from the cloud server, wherein the reply includes confirmation regarding whether the cloud server maintains the upgraded hardware element, wherein the reply is received in response to the calling of the plurality of cloud servers, wherein the one or more of the plurality of cloud servers include the cloud server having the upgraded hardware element.

2. The method of claim 1, further comprising authenticating at least one of the cloud server and the upgraded hardware element to establish trust between the computing device and the cloud server prior to establishing communication between the computing device and the cloud server.

3. The method of claim 2, wherein the communication comprises a short-term communication or a long-term communication based on the amount of time.

4. At least one non-transitory machine-readable medium comprising a plurality of instructions that in response to being executed on a computing device, causes the computing device to carry out operations comprising:
   detecting a hardware component of the computing device seeking an upgraded hardware element to replace an existing hardware element of the hardware component;
   calling, over a network, a plurality of cloud servers to determine whether one or more of the plurality of cloud servers are capable of offering the upgraded hardware element, wherein calling includes finding a cloud server capable of offering the updated hardware component;
   if the upgraded hardware element is not available locally, authenticating the cloud server and establishing trust between the cloud server and the computing device to facilitate communication between the cloud server and the computing device, and facilitating the hardware component to access and use the upgraded hardware element at the cloud server without having to upgrade or replace the existing hardware element of the hardware component, wherein the upgraded hardware element is accessed or used on a short-term basis or a long-term basis based on an amount of time for which the upgraded hardware element is needed by the hardware component of the computing device;

if the upgraded hardware element is available locally, performing local upgrading of the existing hardware element of the hardware component, and in response to calling, receiving a reply from the cloud server, wherein the reply includes confirmation regarding whether the cloud server maintains the upgraded hardware element, wherein the reply is received in response to the calling of the plurality of cloud servers, wherein the one or more of the plurality of cloud servers include the cloud server having the upgraded hardware element.

5. The non-transitory machine-readable medium of claim 4, wherein the operations further comprise authenticating at least one of the cloud server and the upgraded hardware element to establish trust between the computing device and the cloud server prior to establishing communication between the computing device and the cloud server.

6. The non-transitory machine-readable medium of claim 4, wherein the communication comprises a short-term communication or a long-term communication based on the amount of time.

7. An apparatus comprising:
a computing system having a processor, and a memory coupled with the processor, wherein the processor to:
detect a hardware component of the computing device seeking an upgraded hardware element to replace an existing hardware element of the hardware component;
call, over a network, a plurality of cloud servers to determine whether one or more of the plurality of cloud servers are capable of offering the upgraded hardware element, wherein calling includes finding a cloud server capable of offering the updated hardware component;

if the upgraded hardware element is not available locally, authenticate the cloud server and establish trust between the cloud server and the computing device to facilitate communication between the cloud server and the computing device, and facilitate the hardware component to access and use the upgraded hardware element at the cloud server without having to upgrade or replace the existing hardware element of the hardware component, wherein the upgraded hardware element is accessed or used on a short-term basis or a long-term basis based on an amount of time for which the upgraded hardware element is needed by the hardware component of the computing device;

if the upgraded hardware element is available locally, perform local upgrading of the existing hardware element of the hardware component; and in response to calling, receive a reply from the cloud server, wherein the reply includes confirmation regarding whether the cloud server maintains the upgraded hardware element, wherein the reply is received in response to the calling of the plurality of cloud servers, wherein the one or more of the plurality of cloud servers include the cloud server having the upgraded hardware element.

8. The apparatus of claim 7, wherein the processor is further to authenticate at least one of the cloud server and the upgraded hardware element to establish trust between the computing device and the cloud server prior to establishing communication between the computing device and the cloud server.

9. The apparatus of claim 8, wherein the communication comprises a short-term communication or a long-term communication based on the amount of time.

* * * * *